United States Patent
Mowlaee et al.

(10) Patent No.: US 11,470,429 B2
(45) Date of Patent: Oct. 11, 2022

(54) METHOD OF OPERATING AN EAR LEVEL AUDIO SYSTEM AND AN EAR LEVEL AUDIO SYSTEM

(71) Applicant: WIDEX A/S, Lynge (DK)

(72) Inventors: Pejman Mowlaee, Valby (DK); Lars Dalskov Mosgaard, Copenhagen (DK); Thomas Bo Elmedyb, Herlev (DK); Michael Johannes Pihl, Copenhagen (DK); Georg Stiefenhofer, Hundested (DK); David Pelegrin-Garcia, Lyngby (DK); Adam Westermann, Copenhagen (DK)

(73) Assignee: Widex A/S, Lynge (DK)

( * ) Notice: Subject to any disclaimer, the term of this patent is extended or adjusted under 35 U.S.C. 154(b) by 47 days.

(21) Appl. No.: 17/268,148

(22) PCT Filed: May 9, 2019

(86) PCT No.: PCT/EP2019/061993
§ 371 (c)(1),
(2) Date: Feb. 12, 2021

(87) PCT Pub. No.: WO2020/035180
PCT Pub. Date: Feb. 20, 2020

(65) Prior Publication Data
US 2021/0168534 A1    Jun. 3, 2021

(30) Foreign Application Priority Data

Aug. 15, 2018 (DK) .............................. PA201800462
Aug. 15, 2018 (DK) .............................. PA201800465

(51) Int. Cl.
*H04R 25/00* (2006.01)
*G10L 25/78* (2013.01)

(52) U.S. Cl.
CPC ............ *H04R 25/505* (2013.01); *G10L 25/78* (2013.01); *H04R 25/405* (2013.01);
(Continued)

(58) Field of Classification Search
CPC .... H04R 25/505; H04R 25/405; H04R 25/70; H04R 2225/41; H04R 2225/43;
(Continued)

(56) References Cited

U.S. PATENT DOCUMENTS

2011/0015924 A1    1/2011  Gunel Hacihabiboglu et al.
2015/0163602 A1    6/2015  Pedersen et al.
(Continued)

FOREIGN PATENT DOCUMENTS

WO    2012/076045 A1    6/2012

OTHER PUBLICATIONS

R. Kutil, "Biased and unbiased estimation of the circular mean resultant length and its variance", Internet Citation, XP002788241, Aug. 1, 2012, pp. 549-561 (14 pages total).
(Continued)

*Primary Examiner* — Tuan D Nguyen
(74) *Attorney, Agent, or Firm* — Sughrue Mion, PLLC (57) ABSTRACT

A method of operating an ear level audio system in order to provide improved own voice detection and an ear level audio system (100) for carrying out the method.

9 Claims, 2 Drawing Sheets

(52) U.S. Cl.
CPC ........... *H04R 25/407* (2013.01); *H04R 25/70* (2013.01); *H04R 2225/41* (2013.01); *H04R 2225/43* (2013.01)

(58) Field of Classification Search
CPC ................ H04R 25/552; H04R 25/554; H04R 2460/01; H04S 1/005; H04S 2420/01; G10L 25/78; G10L 17/00; G01S 3/8083
See application file for complete search history.

(56) References Cited

U.S. PATENT DOCUMENTS

| | | | |
|---|---|---|---|
| 2015/0289064 A1 | 10/2015 | Jensen et al. | |
| 2017/0347206 A1* | 11/2017 | Pedersen | G10L 21/0208 |
| 2018/0262849 A1* | 9/2018 | Farmani | H04R 25/407 |
| 2018/0359572 A1* | 12/2018 | Jensen | H04R 25/405 |

OTHER PUBLICATIONS

Cabot, "An Introduction to Circular Statistics and Its Application to Sound Localization Experiments", AES, XP002788240, Nov. 1977 (20 pages total).
International Search Report for PCT/EP2019/061993 dated Jul. 11, 2019 (PCT/ISA/210).
Written Opinion for PCT/EP2019/061993 dated Jul. 11, 2019 (PCT/ISA/237).

* cited by examiner

METHOD OF OPERATING AN EAR LEVEL AUDIO SYSTEM AND AN EAR LEVEL AUDIO SYSTEM

The present invention relates to a method of operating an ear level audio system. The present invention also relates to an ear-level audio system adapted to carry out said method.

BACKGROUND OF THE INVENTION

An ear level audio system may comprise one or two ear level audio devices. In this application, an ear level audio device should be understood as a small, battery-powered, microelectronic device designed to be worn in or at an ear of a user. The ear level audio device generally comprises an energy source such as a battery or a fuel cell, at least one microphone, an internal sound generator, a microelectronic circuit comprising a digital signal processor, and an acoustic output transducer. The ear level audio device is enclosed in a casing suitable for fitting in or at (such as behind) a human ear.

Thus according to the present context devices such as e.g. hearables, headsets, headphones and ear pods may be considered ear level audio devices.

If the ear level audio device furthermore is capable of amplifying an ambient sound signal in order to alleviate a hearing deficit the ear level audio device may be considered a personal sound amplification product or a hearing aid.

According to variations the mechanical design of an ear level audio device may resemble those of hearing aids and as such traditional hearing aid terminology may be used to describe various mechanical implementations of ear level audio devices that are not hearing aids. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In more recent types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids. In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids or Invisible-In-Canal (IIC). This type of hearing aid requires an especially compact design in order to allow it to be arranged in the ear canal, while accommodating the components necessary for operation of the hearing aid.

It has been known in the art to include means for detection of a user's own voice in this type of ear level audio systems. This may be advantageous with respect to providing a special customized processing for a situation where the user's own voice is detected in order to provide the user's own voice sounding as natural as possible. This generally requires own voice detection that is reliable, fast and preferably can be determined independently in a multitude of frequency ranges (i.e. frequency bands).

However, own voice detection may also advantageous in connection with voice command systems where the reliability of the own voice detection is the primary concern.

It is therefore a feature of the present invention to provide an improved method of own voice detection in an ear level audio system.

It is another feature of the present invention to provide an ear level audio system adapted to provide such a method of own voice detection.

SUMMARY OF THE INVENTION

The invention, in a first aspect, provides a method of operating an ear level audio system according to claim 1.

This provides an improved method of providing own voice detection in an ear level audio system.

The invention, in a second aspect, provides an ear level audio system according to claim 9.

This provides an ear level audio system with improved means for providing own voice detection.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

Figure 1:
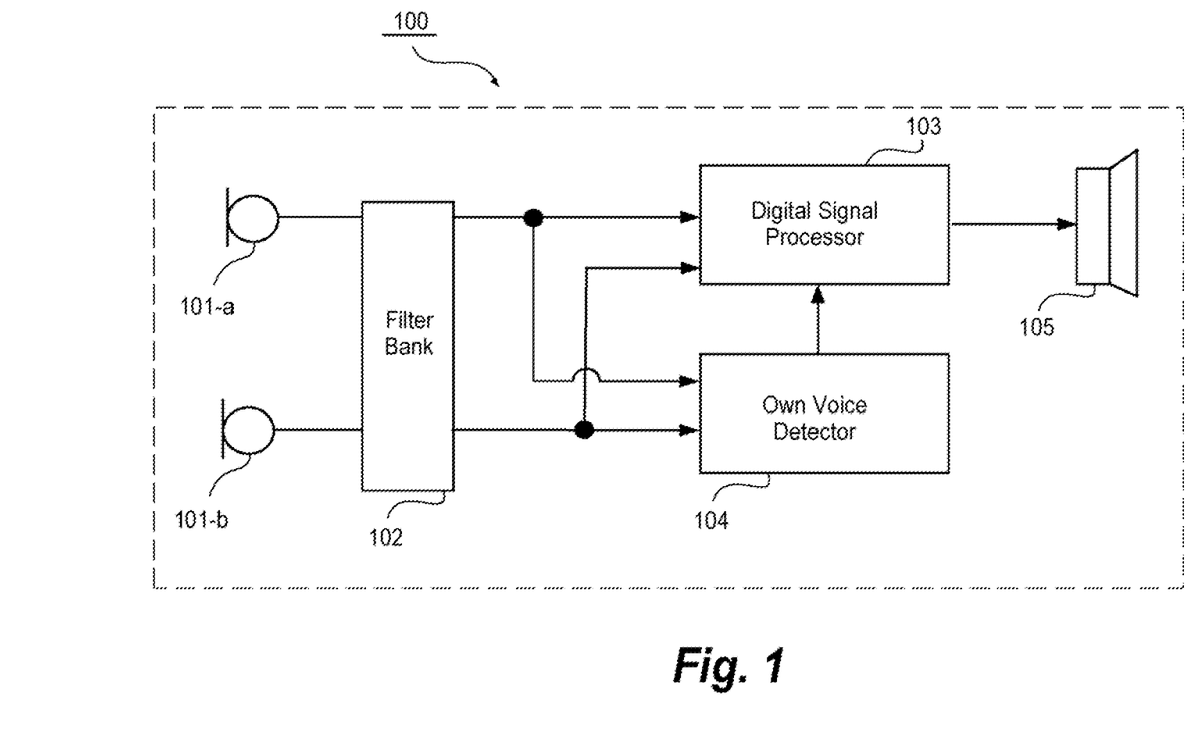
FIG. 1 illustrates highly schematically an ear level audio device according to an embodiment of the invention.

Reference is first made to FIG. 1, which illustrates highly schematically part an ear level audio system 100 according to an embodiment of the invention.

The ear level audio system 100 takes as input, the digital output signals, at least, derived from the two acoustical-electrical input transducers 101*a-b*.

According to the embodiment of FIG. 1, the acoustical-electrical input transducers 101*a-b*, which in the following may also be denoted microphones, provide analog output signals that are converted into digital output signals by analog-digital converters (ADC) and subsequently provided to a filter bank 102 adapted to transform the signals into the time-frequency domain. One specific advantage of transforming the input signals into the time-frequency domain is that both the amplitude and phase of the signals become directly available in the provided individual time-frequency bins. According to an embodiment a Fast Fourier Transform (FFT) may be used for the transformation and in variations other time-frequency domain transformations can be used such as a Discrete Fourier Transform (DTF), a Short-Time Fourier Transform (STFT), polyphase filterbanks, Discrete Cosine Transformations and weighted overlap-add (WOLA) transformations.

However, for reasons of clarity the ADCs are not illustrated in FIG. 1. Furthermore, in the following, the output signals from the filter bank 102 will primarily be denoted input signals because these signals represent the primary input signals to the digital signal processor 103 of the ear level audio system as well as to the own voice detector 104. Additionally, the term digital input signal may be used interchangeably with the term input signal. In a similar manner all other signals referred to in the present disclosure may or may not be specifically denoted as digital signals. Finally, at least the terms input signal, digital input signal, frequency band input signal, sub-band signal and frequency band signal may be used interchangeably in the following and unless otherwise noted the input signals can generally be assumed to be frequency band signals independent on whether the filter bank 102 provide frequency band signals in the time domain or in the time-frequency domain. Furthermore, it is generally assumed, here and in the following, that the microphones 101a-b are omni-directional unless otherwise mentioned.

In a variation the input signals are not transformed into the time-frequency domain. Instead the input signals are first transformed into a number of frequency band signals by a time-domain filter bank comprising a multitude of time-domain bandpass filters, such as Finite Impulse Response bandpass filters and subsequently the frequency band signals may be compared using correlation analysis wherefrom the phase can be derived.

Both the digital input signals are branched, whereby the input signals, in a first branch, is provided to the digital signal processor 103, and, in a second branch, is provided to the own voice detector 104.

According to the present embodiment the own voice detection is based on the spatial and acoustic properties of the user's own voice. The location of the own voice is fixed relative to the ear level audio system and as a source the position of the own voice is very well defined, because the impact from reverberation and especially the early reflections are limited due to the short distance between the ear level audio system and the users mouth.

In the following the inter-microphone phase difference (IPD) between the input signals from the acoustical-electrical input transducers 101a-b is estimated by considering the properties of periodic variables, which due to mathematically convenience will be described as complex numbers. An estimate of the IPD between said input signals may therefore be given as a complex number that in polar representation has an amplitude A and a phase θ. The average of a multitude of IPD estimates may be given by:

$$\langle Ae^{-i\theta}\rangle = \frac{1}{n}\sum_{i=1}^{n} A_i e^{-i\theta_i} = R_A e^{-i\hat{\theta}_A} \quad \text{(eq. 1)}$$

Wherein $\langle\ \rangle$ is the average operator, n represents the number of IPD estimates used for the averaging, $R_A$ is an averaged amplitude that depends on the phase and that may assume values in the interval $[0, \langle A\rangle]$, and $\theta_A$ is the weighted mean phase. It can be seen that the amplitude $A_i$ of each individual sample weight each corresponding phase $\theta_i$ in the averaging. Therefore both the averaged amplitude $R_A$ and the weighted mean phase $\hat{\theta}_A$ are biased (i.e. dependent on the other).

It is noted that the present invention is independent of the specific choice of statistical operator used to determine an average, and consequently within the present context the terms expectation operator, average, sample mean, expectation or mean may be used to represent the result of statistical functions or operators selected from a group comprising the Boxcar function. In the following these terms may therefore be used interchangeably.

The amplitude weighting providing the weighted mean phase $\hat{\theta}_A$ will generally result in the weighted mean phase $\hat{\theta}_A$ being different from the unbiased mean phase $\hat{\theta}$ that is defined by:

$$\langle e^{-i\theta}\rangle = \frac{1}{n}\sum_{i=1}^{n} e^{-i\theta_i} = Re^{-i\hat{\theta}} \quad \text{(eq. 2)}$$

As in equation (1) $\langle\ \rangle$ is the average operator and n represents the number of inter-microphone phase difference samples used for the averaging. For convenience reasons the inter-microphone phase difference samples may in the following simply be denoted inter-microphone phase differences. It follows that the unbiased mean phase $\hat{\theta}$ can be estimated by averaging a multitude of inter-microphone phase difference samples. R is denoted the mean resultant length and the mean resultant length R provides information on how closely the individual phase estimates $\theta_i$ are grouped together and the circular variance V and the mean resultant length R are related by:

$$V = 1 - R \quad \text{(eq. 3)}$$

The inventors have found that the information regarding the amplitude relation, which is lost in the determination of the unbiased mean phase $\hat{\theta}$, the mean resultant length R and the circular variance V turns out to be advantageous because more direct access to the underlying phase probability distribution is provided.

Furthermore the unbiased mean phase provides an improved estimate of the location of a given sound source such as the user's mouth.

Now, in order to estimate the inter-microphone phase difference (IPD) between the two input signals an instantaneous IPD at frame l and frequency bin k is initially determined. The instantaneous IPD which in the following is denoted by $e^{j\theta_{ab}(k,l)}$ and which in the following may be denoted IPD, thus leaving out the term instantaneous for reasons of clarity, may be given by the instantaneous normalized cross-spectrum:

$$e^{j\theta_{ab}(k,l)} = \frac{X_a(k,l)X^*_b(k,l)}{|X_a(k,l)|\,|X_b(k,l)|}; \quad \text{(eq. 4)}$$

where $X_a(k, l)$ and $X_b(k, l)$ represent the short-time Fourier transforms of the input signals at the two microphones as provided by the frequency domain filter bank 102. It is assumed that $\theta_{ab}(k, l)$ is a specific realization of a circular random variable $\Theta$ and therefore that the statistical properties of the IPDs are governed by circular statistics and therefore that the mean of the IPD may be given by:

$$E\{e^{j\theta_{ab}(k,l)}\} = R_{ab}(k,l)e^{j\hat{\theta}_{ab}(k,l)}; \quad \text{(eq. 5)}$$

where E is a short-time expectation operator (moving average), $\hat{\theta}_{ab}$ is the unbiased mean phase and $R_{ab}$ is the mean resultant length. It is noted that eq. 5 is very similar to eq. 2, the primary difference being the notation and the specification that the Instantaneous IPD is given as a function of the Fourier transformation frame 1 and the frequency bin k. The mean resultant length carries information about the directional statistics of the impinging signals at the ear level audio system, specifically about the spread of the IPD. In the following the unbiased mean phase may interchangeably be represented by $\hat{\theta}_{ab}$ or $\hat{\theta}$ and similarly the mean resultant length may interchangeably be represented by $R_{ab}$ or R.

Now, own voice may be detected by using said first and second input signals in the time-frequency domain to determine a frequency dependent unbiased mean phase from a mean of an estimated inter-microphone phase difference. The value of the frequency dependent unbiased mean phase can identify the situation where the user is speaking in response to a detection that said value is within a predetermined range. In case said first and second microphones of a binaural ear level audio system are accommodated in the left and right ear level audio device respectively then the trigger criteria will be that the value of the unbiased mean phase, for a given frequency range, such as a frequency band, falls below a predetermined trigger value, because the value ideally will be zero as a consequence of the ear level audio device being positioned with the same distance to the users mouth.

According to a variation each ear level audio device of a binaural ear level audio system comprises a set (i.e. a multitude) of microphones wherefrom signals may be derived (e.g. in the form of a beam formed signals) that can be used to determined frequency dependent unbiased mean phase and hereby identifying the situation that a user of the ear level audio system is speaking.

However, according to other variations both microphones are accommodated in a single ear level audio device, which obviously will require that the unbiased mean phase falls within a certain predetermined interval having values larger than zero.

According to yet other variations multiple microphone pairs are considered and combined in order to obtain an improved own voice detection.

According to a variation the estimated frequency dependent unbiased mean phase is processed such that a pair of input signals representing a situation where the user of the ear level audio system is speaking will provide a processed unbiased mean phase estimate of zero for all considered frequencies and independent of the positioning of the microphones from which said pair of input signals are at least derived from.

More specifically said processing is carried out by determining the difference between the estimated frequency dependent unbiased mean phase and a target unbiased mean phase obtained based on input signals representing a case where only the ear level audio system user is speaking. According to a preferred variation this processing is carried out using an associated computing device having a software application adapted to assist the user in carrying out the processing and adapted to interact with the ear level audio device such that the results of the processing are stored in the ear level audio system and used to improve the own voice detection further. According to an even more specific variation the processing is carried out as part of an initial hearing aid system programming (i.e. fitting) in case the ear level audio system is a hearing aid system.

It has been found that this processing especially improves performance in scenarios where another speaker is close and right in front of the user.

For the IPD estimation strategy to be robust in realistic dynamic sound environments it is generally preferred that the input signals (i.e. the sound environment) can be considered quasi stationary. The two main sources of dynamics are the temporal and spatial dynamics of the sound environment. For speech the duration of a short consonant may be as short as only 5 milliseconds, while long vowels may have a duration of up to 200 milliseconds depending on the specific sound. The spatial dynamics is a consequence of relative movement between the ear level audio system user and surrounding sound sources. As a rule of thumb speech is considered quasi stationary for a duration in the range between say 20 and 40 milliseconds and this includes the impact from spatial dynamics.

For estimation accuracy, it is generally preferable that the duration of the involved time windows are as long as possible, but it is, on the other hand, detrimental if the duration is so long that it covers natural speech variations or spatial variations and therefore cannot be considered quasi-stationary.

According to an embodiment of the present invention a first time window is defined by the transformation of the digital input signals into the time-frequency domain and the longer the duration of the first time window the higher the frequency resolution in the time-frequency domain, which obviously is advantageous. Additionally, the present invention may require that the determination of an unbiased mean phase and a corresponding mean resultant length of an inter-microphone phase difference is based on a calculation of an expectation value and it has been found that the number of individual samples used for calculation of the expectation value preferably exceeds at least 5.

According to a specific embodiment the combined effect of the first time window and the calculation of the expectation value provides an effective time window that is shorter than 40 milliseconds or in the range between 5 and 200 milliseconds such that the sound environment in most cases can be considered quasi-stationary.

According to variations improved accuracy of the unbiased mean phase and the mean resultant length may be provided by obtaining a multitude of successive samples of the unbiased mean phase and the mean resultant length, in the form of a complex number using the methods according to the present invention and subsequently adding these successive estimates (i.e. the complex numbers) and normalizing the result of the addition with the number of added estimates. This embodiment is particularly advantageous in that the mean resultant length effectively weights the samples that have a high probability of comprising a target source, while estimates with a high probability of mainly comprising noise will have a negligible impact on the final value of the unbiased mean phase of the inter-microphone phase difference because the samples are characterized by having a low value of the mean resultant length. Using this method it therefore becomes possible to achieve pseudo time windows with a duration up to say several seconds or even longer and the improvements that follows therefrom, despite the fact that neither the temporal nor the spatial variations can be considered quasi-stationary.

In a variation at least one or at least not all of the successive complex numbers representing the unbiased mean phase and the mean resultant length are used for improving the estimation of the unbiased mean phase of the inter-microphone phase difference, wherein the selection of the complex numbers to be used are based on an evaluation of the corresponding mean resultant length (i.e. the variance) such that only complex numbers representing a high mean resultant length are considered.

According to another variation the estimation of the unbiased mean phase of the inter-microphone phase difference is additionally based on an evaluation of the value of the individual samples of the unbiased mean phase such that only samples representing the same target source are combined.

More generally the mean resultant length can be used to compare or weight information obtained from a multitude of microphone pairs, such as the multitude of microphone pairs that may be available in a binaural ear level audio system comprising two ear level audio devices each having two microphones. According to a specific variation the determination of whether the target source is the user's mouth is provided by combining a monaurally determined unbiased mean phase with a binaurally determined unbiased mean phase, whereby the symmetry ambiguity that results when translating an estimated phase to a target direction may be resolved.

According to other variations identification of a direct sound (such as own voice) can be made if a value of the mean resultant length, for at least one frequency range, is above a mean resultant length direct sound trigger level, while on the other hand identification of a diffuse, random or incoherent noise field can be made if a value of the mean resultant length, for at least one frequency range, is below a mean resultant length noise trigger level.

According to still further variations the mean resultant length may be used to estimate the variance of a correspondingly determined unbiased mean phase from samples of inter-microphone phase differences and evaluate the validity of a determined unbiased mean phase based on the estimated variance for the determined unbiased mean phase.

Generally improved accuracy of the determined unbiased mean phase is achieved by at least one of averaging and fitting a multitude of determined unbiased mean phases across at least one of time and frequency by weighting the determined unbiased mean phases with the correspondingly determined mean resultant length.

In yet another variation the mean resultant length may be used to perform hypothesis testing of probability distributions for a correspondingly determined unbiased mean phase.

According to another advantageous embodiment corresponding values, in time and frequency, of the unbiased mean phase and the mean resultant length can be used to identify and distinguish between at least two target sources, based on identification of direct sound comprising at least two different values of the unbiased mean phase.

According to yet another advantageous embodiment corresponding values, in time and frequency, of the unbiased mean phase and the mean resultant length can be used to estimate whether a distance to a target source is increasing or decreasing based on whether the value of the mean resultant length is decreasing or increasing respectively. This can be done because the reflections, at least while being indoors in say some sort of room will tend to dominate the direct sound, when the target source moves away from the ear level audio system user. Obviously, this can be used to further improve the reliability of the own voice detection since the value of the mean resultant length associated with own voice must remain relatively constant.

For diffuse noise scenarios, the mean resultant length for low frequencies ($f \ll f_u = c/2d$, where $f_u$ is the upper frequency limit below which phase ambiguities, due to the $2\pi$ periodicity of the IPD, are avoided) approaches one. It gets close to zero as the frequency approaches the phase ambiguity limit. Thus, at low frequencies, both diffuse noise and localized sources have similar mean resultant length $R_{ab}$ and it becomes difficult to statistically distinguish the two sound fields from each other. To resolve that the IPD may be transformed such that the probability density for diffuse noise is mapped to a uniform distribution for all frequencies up to $f_u$ while preserving the mean resultant length $R_{ab}$ of localized sources. Under free- and far-field conditions and assuming that the inter-microphone spacing d is known, the mapped mean resultant length $\tilde{R}_{ab}(k, l)$, which is the mean resultant length of the transformed IPD, takes the form:

$$\tilde{R}_{ab}(k,l) = |E\{e^{j\theta_{ab}(k,l)k_u/k}\}|, \quad \text{(eq. 6)}$$

wherein $k_u = 2K\, f_u/f_s$, with $f_s$ being the sampling frequency, K the number of frequency bins up to the Nyquist limit. The mapped mean resultant length $\tilde{R}_{ab}$ for diffuse noise approaches zero for all $k < k_u$ while for anechoic sources it approaches one as intended.

Commonly used methods for estimating diffuse noise are only applicable for $k > k_u$. Unlike those methods, the mapped mean resultant length $\tilde{R}_{ab}$ works best for $k < k_u$ and is particularly suitable for short microphone spacings typical for ear level audio devices. Thus by using the mapped mean resultant length $\tilde{R}_{ab}$ instead of the mean resultant length $R_{ab}$, a more correct weight may be applied to time-frequency frames with diffuse noise especially for low frequency IPD estimations based on small microphone arrays.

In variations only frequencies up to $f_u$ are considered when applying the mapped mean resultant length $\tilde{R}_{ab}$ for the various estimations of the present invention. At higher frequencies, both for the small spacing between the two microphones in a single ear level device (i.e., monaural case) and between to microphones accommodated at or in different ears (i.e., binaural case), the assumptions of free- and far-field break down, which makes the implementation of a system for determining DOA considerably more complex.

According to yet another variation monitoring of the unbiased mean phase and the corresponding variance may be used for speech detection either alone or in combination with traditional speech detection methods, such as the methods disclosed in WO-A1-2012076045. The basic principle of this specific embodiment being that an unbiased mean phase estimate with a low variance is very likely to represent a sound environment with a single primary sound source. However, since a single primary sound source may be single speaker or something else such as a person playing music it will be advantageous to combine the basic principle of this specific embodiment with traditional speech detection methods based on e.g. the temporal or level variations or the spectral distribution.

Figure 2:
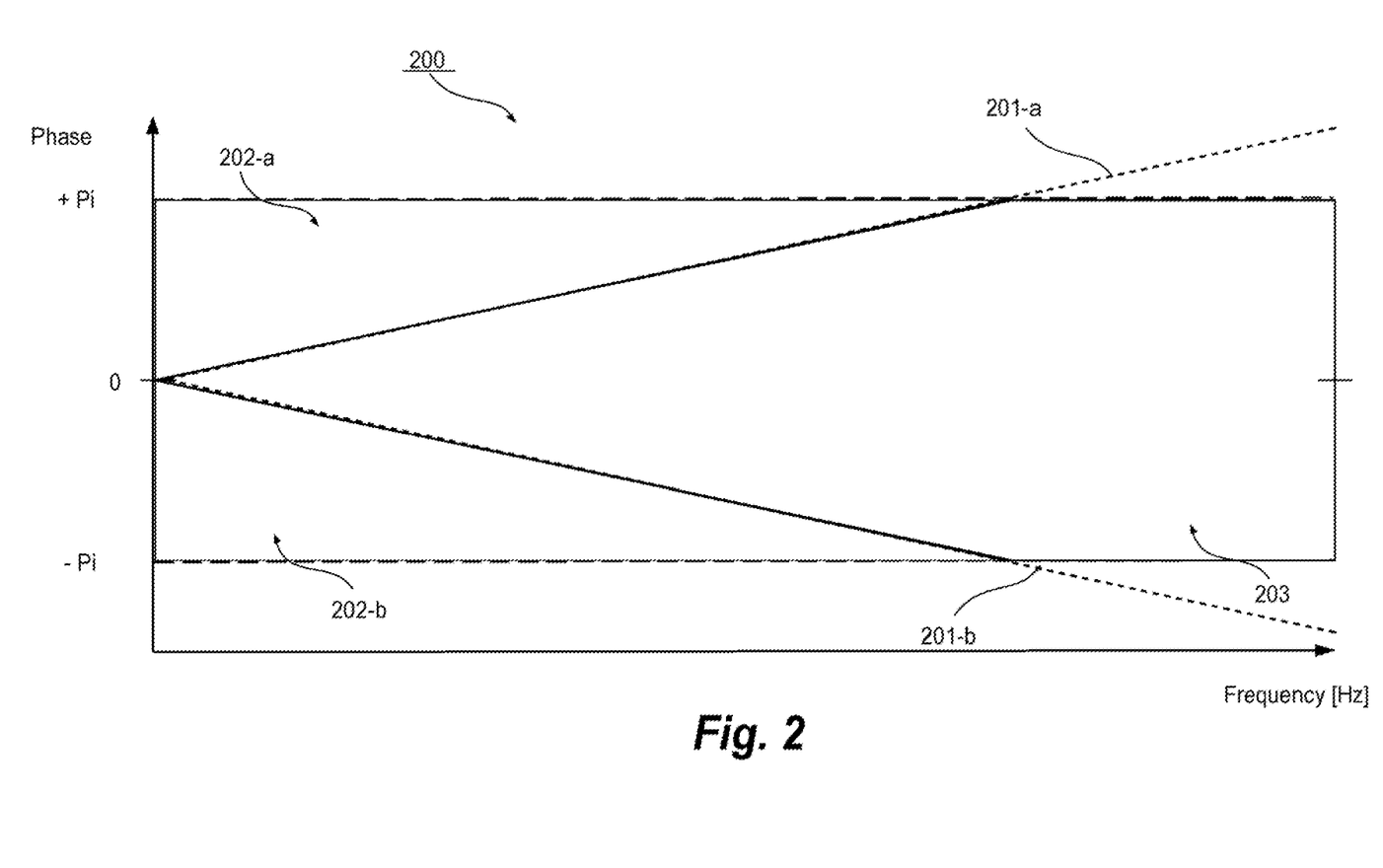
FIG. 2 illustrates highly schematically a map of values of the unbiased mean phase as a function of frequency in order to provide a phase versus frequency plot.

Reference is now made to FIG. 2, which illustrates highly schematically a map of values of the unbiased mean phase as a function of frequency in order to provide a phase versus frequency plot.

According to an embodiment of the present invention the phase versus frequency plot can be used to identify a direct sound if said mapping provides a straight line or at least a continuous curve in the phase versus frequency plot.

Assuming free field a direct sound will provide a straight line in the plot, but in the real world conditions a non-straight curve will result, which will primarily be determined by the head related transfer function of the user wearing the ear level audio system and the mechanical design of the ear level audio system itself. Assuming free field the curve 201-A represents direct sound from a target positioned directly in front of the ear level audio system user assuming an ear level audio device having two microphones positioned along the direction perpendicular to the user's ears. Correspondingly the curve 201-B represents direct sound from a target directly behind the ear level audio system user.

Generally, the angular direction of the direct sound from a given target source may be determined from the fact that the slope of the interpolated straight line representing the direct sound is given as:

$$\frac{\partial \theta}{\partial f} = \frac{2\pi d}{c} \qquad \text{(eq. 7)}$$

Wherein d represents the distance between the microphones and c is the speed of sound. The so called coherent region 203 is defined as the area in the phase versus frequency plot that is bounded by the at least continuous curves defining direct sounds coming directly from the front and the back direction respectively and the curves defining a constant phase of +π and −π respectively. Any data points outside the coherent region, i.e. inside the incoherent regions 202-a and 202-b will represent a random or incoherent noise field.

According to a variation the unwrapped unbiased mean phase $\theta_{UW}$ and its corresponding variance $R_{UW}$ (i.e. the unwrapped mean resultant length) is used to estimate the IPD. The unwrapped measures may be given as:

$$R_{UW} \cdot e^{i\theta_{UW}} = E\left[\left(\frac{M_1 M_2^*}{|M_1 M_2^*|}\right)^{\frac{c}{2f \cdot d}}\right] \qquad \text{(eq. 8)}$$

Wherein $M_1$ and $M_2$ represent the input signals (which can be any set) in the time-frequency domain representation at one particular frequency (or frequency band), c is the speed of sound and d is the inter-microphone spacing of the considered microphone set.

The unwrapped unbiased mean phase $\theta_{UW}$ and its unwrapped mean resultant length $R_{UW}$ have a number of attractive features. The unwrapped unbiased mean phase effectively maps the coherent region onto the full 2π support. Unwrapping therefore provides that all phase difference estimates are mapped onto the same support, independent of microphone spacing, and that the frequency dependence of the support is removed. This means that e.g. spatially-diffuse sound corresponds to a uniform distribution between −π to π and that averaging across frequency can be done without introducing errors. In the normal phase space the time difference between two microphones corresponds to a slope of the phase across frequency. In the unwrapped space a time difference corresponds to an offset under free field assumptions.

In a variation of the present invention a plurality of weighted unbiased mean phases is fitted as a function of frequency, wherein the unbiased mean phases are determined from a transformed estimated inter-microphone phase difference $IPD_{Tranform}$ given by the expression:

$$IPD_{Tranform} = e^{\frac{j\theta_{ab}(k,l)k_u}{k}} \qquad \text{(eq. 9)}$$

wherein $k_u = 2K\, f_u/f_s$, with $f_s$ being the sampling frequency and K being the number of frequency bins up to the Nyquist limit. Assuming free and far field this transformation maps a TDoA to not represent the slope of the mean inter-microphone phase difference but rather a parallel offset of the mean of a transformed estimated inter-microphone phase difference across frequency, which can be estimated by fitting accordingly, again using a reliability measure as weighting in the fit. This approach offers a particularly efficient TDoA estimation method for particularly signals impinging perpendicularly to a line connecting two binaurally positioned microphones of an ear level audio system. Thus a particular usage of this TDoA estimation is for binaural own voice detection where the own voice generally has a binaural TDoA of zero.

In yet other variations of the present invention the mapped mean resultant length $\tilde{R}_{ab}$ may be given by other expressions than the one given in (eq. 6), e.g.:

$$\tilde{R}_{ab}(k,l) = |E\{f(e^{j\theta_{ab}(k,l)p(k,l)})\}| \qquad \text{(eq. 10)}$$

wherein indices l and k represent respectively the frame used to transform the input signals into the time-frequency domain and the frequency bin; wherein E is an expectation operator; wherein $e^{j\theta_{ab}(k,l)}$ represents the inter-microphone phase difference between the first and the second microphone; wherein p is a real variable; and wherein f is an arbitrary function.

In more specific variations p is an integer in the range between 1 and 6 and the function f is given as f(x)=x, whereby the mapped mean resultant lengths according to these specific variations represent the circular statistics moments, which may give insight into the underlying probability distributions.

It is noted that the variations of the mapped mean resultant length given by eq. 10 also provides additional reliability measures.

In a specific variation the reliability measure associated with an unbiased mean phase may be dependent on the sound environment such that e.g. the reliability measure is based on the mean resultant length as given in eq. 5, or the mapped mean resultant length as given in eq. 6 or eq. 10, if the sound environment is dominantly uncorrelated noise and is based on the unwrapped mean resultant length, i.e. as given in eq. 8, if diffuse noise dominates the sound environment.

The present method and its variations are particularly attractive for use in ear level audio systems, because these systems due to size requirements only offer limited processing resources, and the present invention provides a very precise own voice detection while only requiring relatively few processing resources.

It follows from the disclosed embodiments and the many associated variations of the various features that the variants of one feature may be combined with the variants of other features, also from other embodiments, unless it is specifically noted that this is not possible. Thus as one example it is emphasized that generally all variations of the present invention may be combined with both the mean resultant length and the mapped mean resultant length.

In further variations the unbiased mean phases and the corresponding reliability measures are provided directly to machine learning methods, such as deep neural networks and Bayesian methods in order to provide the own voice detection.

It is noted that these machine learning methods benefit drastically by the estimated reliability measures provided by the present invention.

Summarizing a method of the invention can according to an embodiment be described by the following steps:
  providing a first and a second input signal, representing the outputs from a first and a second microphone respectively or representing outputs derived from a first and a second set of microphones respectively, and transforming the input signals from a time domain representation and into a time-frequency domain representation, and estimating an inter-microphone phase difference using the input signals in the time-frequency domain representation, and determining at least one frequency dependent unbiased mean phase from a mean of an estimated inter-microphone phase difference or from a mean of a transformed estimated inter-microphone phase difference, and identifying the situation that a user of the ear level audio system is speaking, in response to a determination that the determined frequency dependent unbiased mean phase is within a predetermined first range, and providing, in response to said identification, information related to the identification that the user of the hearing is speaking to at least one ear level audio system processing stage.

The method of the invention is at least advantageous in using the frequency dependent unbiased mean phase to enable own voice detection in separate frequency bands, whereby own voice signal processing may be optimized, because only the frequency bands that in fact contain own voice need to be processed in a special manner whereby the resulting sound can sound more natural and can contain fewer sound artefacts.

Generally special processing of own voice may be advantageous in order to alleviate the detrimental effects of occlusion and ampclusion as well to improve the handling of the various dynamic aspects of speech when own voice is also considered. Thus according to one example special processing of own voice may comprise lowering the gain when own voice is detected.

According to an embodiment a more specific method of the invention can be described by the additional steps of:

determining at least one frequency dependent mean resultant length from a mean of an estimated inter-microphone phase difference or from a mean of a transformed estimated inter-microphone phase difference, and using the determined frequency dependent mean resultant length to:

determine an improved frequency dependent unbiased mean phase by averaging over time a plurality of unbiased mean phases that have been weighted based on corresponding mean resultant lengths or based on corresponding variance measures derived from the mean resultant lengths.

Hereby the reliability of the own voice detection (i.e. the identification that a user of the ear level audio system is speaking) may be improved, in flexible manner that e.g. doesn't require a change of the frame length when transforming the input signals into a time-frequency domain representation.

According to an embodiment an even more specific method of the invention can be described by the additional steps of:

determining at least one frequency dependent mean resultant length from a mean of an estimated inter-microphone phase difference or from a mean of a transformed estimated inter-microphone phase difference, and requiring that the frequency dependent mean resultant length or a variance measure derived from the mean resultant length is within a predetermined second range in order to identify the situation that a user of the ear level audio system is speaking.

Hereby is taken advantage of the fact that the value of the mean resultant length for a sound source may increase with decreasing distance to the ear level auditory system as a result of dereverberation and therefore may be used in an additional criteria adapted for improving the reliability of own voice detection.

However, in other embodiments the mean resultant length or a variance measure derived from the mean resultant length may also be used to estimate the probability that an own voice detection is correct and in response to the estimation adapt the applied own voice processing accordingly, e.g. by making smaller gain adjustments or by applying the changes to the processing slower if the probability that the own voice detection is correct is relatively low.

According to an embodiment an especially advantageous and specific method of the invention can be described by the additional steps of:

determining a multitude of frequency dependent unbiased mean phases from a multitude of input signal pairs, and determining a corresponding multitude of input signal pair specific target unbiased mean phases, and determining, for said multitude of input signal pairs, a difference between the frequency dependent unbiased mean phase and the target unbiased mean phase, and determining, for said multitude of input signal pairs, a frequency dependent mean resultant length, or a variance measures derived from the mean resultant length, from a mean of an estimated inter-microphone phase difference or from a mean of a transformed estimated inter-microphone phase difference for said multitude of input signal pairs, and identifying the situation that a user of the ear level audio system is speaking based on combining said frequency dependent mean resultant length, or a variance measure derived from the mean resultant length, and said difference for said multitude of input signal pairs.

Thus having e.g. an ear level audio system comprising a left and a right ear level audio device a multitude of input signal pairs are available, e.g. two microphones accommodated in the same ear level audio device may provide one input signal pair, and two microphones accommodated in respectively the left and the right ear level audio device may provide another input signal pair, while a directional or beam formed signal provided by respectively the left and the right ear level audio device may provide yet another input signal pair. By combining the information provided by a multitude of input signal pairs a fast and reliable own voice detection may be achieved due to the parallel processing carried out by the multitude of input signal pairs. According to an embodiment a frequency dependent own voice detection can be carried out in less than 100 milliseconds or even less than 50 milliseconds.

It is noted that by providing two forward pointing directional signals the ambiguity with respect to whether a sound source is positioned in the front or back half plane that results when considering the inter-microphone phase difference between binaurally accommodated microphones can be resolved.

According to an even more specific embodiment the method of the invention can be described by the additional steps of:

improving the reliability of the identification based on data from said multitude of input signal pairs by using a method selected from a group comprising hypothesis tests, Bayesian inference and Gaussian Mixed Modelling.

According to a more specific embodiment, the especially advantageous method of the invention can be described by the additional steps of:

determining the target unbiased mean phase for a given input signal pair as the unbiased mean phase determined based on said given input signal pair in a situation where only the ear level audio system user is speaking.

Thus in order to facilitate the combination of the information provided by the multitude of input signal pairs the difference between the determined (i.e. measured) unbiased mean phase and a target unbiased mean phase is used to provide a common basis.

Thus the input signal pair specific target unbiased mean phases may be determined by a measurement as discussed above, but in a variation the input signal pair specific target unbiased mean phases can be predetermined without being personalized to the individual user.

According to an embodiment, the method of the invention can be described by the additional steps of:

modifying a frequency dependent parameter in frequency ranges wherein it has been identified that the user of the ear level audio system is speaking, wherein said frequency dependent parameters are selected from a group of parameters comprising frequency dependent amplification, noise estimation and directional system settings.

The invention claimed is:

1. A method of operating an ear level audio system comprising the steps of:
providing a first and a second input signal, representing the outputs from a first and a second microphone respectively or representing outputs derived from a first and a second set of microphones respectively;
transforming the input signals from a time domain representation and into a time-frequency domain representation;
estimating an inter-microphone phase difference using the input signals in the time-frequency domain representation;
determining at least one frequency dependent unbiased mean phase from a mean of an estimated inter-microphone phase difference or from a mean of a transformed estimated inter-microphone phase difference;
identifying the situation that a user of the ear level audio system is speaking, in response to a determination that the determined frequency dependent unbiased mean phase is within a predetermined first range; and
providing, in response to said identification, information related to the identification that the user of the hearing is speaking to at least one ear level audio system processing stage.

2. The method according to claim 1, wherein the step of identifying the situation that a user of the ear level audio system is speaking, in response to a determination that the determined frequency dependent unbiased mean phase is within a predetermined first range, comprises the further steps of:
determining at least one frequency dependent mean resultant length from a mean of an estimated inter-microphone phase difference or from a mean of a transformed estimated inter-microphone phase difference; and
using the determined frequency dependent mean resultant length to:
determine an improved frequency dependent unbiased mean phase by averaging over time a plurality of unbiased mean phases that have been weighted based on corresponding mean resultant lengths or based on corresponding variance measures derived from the mean resultant lengths.

3. The method according to claim 1, wherein the step of identifying the situation that a user of the ear level audio system is speaking, in response to a determination that the determined frequency dependent unbiased mean phase is within a predetermined first range, comprises the further steps of:
determining at least one frequency dependent mean resultant length from a mean of an estimated inter-microphone phase difference or from a mean of a transformed estimated inter-microphone phase difference; and
requiring that the frequency dependent mean resultant length or a variance measure derived from the mean resultant length is within a predetermined second range in order to identify the situation that a user of the ear level audio system is speaking.

4. The method according to claim 1, wherein the step of identifying the situation that a user of the ear level audio system is speaking, in response to a determination that the determined frequency dependent unbiased mean phase is within a predetermined first range, comprises the steps of:
determining a multitude of frequency dependent unbiased mean phases from a multitude of input signal pairs;
determining a corresponding multitude of input signal pair specific target unbiased mean phases;
determining, for said multitude of input signal pairs, a difference between the frequency dependent unbiased mean phase and the target unbiased mean phase;
determining, for said multitude of input signal pairs, a frequency dependent mean resultant length, or a variance measures derived from the mean resultant length, from a mean of an estimated inter-microphone phase difference or from a mean of a transformed estimated inter-microphone phase difference for said multitude of input signal pairs;
identifying the situation that a user of the ear level audio system is speaking based on combining said frequency dependent mean resultant length, or a variance measure derived from the mean resultant length, and said difference for said multitude of input signal pairs.

5. The method according to claim 4, wherein the step of identifying the situation that a user of the ear level audio system is speaking based on combining said frequency dependent mean resultant length, or a variance measures derived from the mean resultant length, and said difference for said multitude of input signal pairs comprises the further steps of:
improving the reliability of the identification based on data from said multitude of input signal pairs by using a method selected from a group comprising hypothesis tests, Bayesian inference and Gaussian Mixed Modelling.

6. The method according to claim 4, wherein the step of determining a corresponding multitude of input signal pair specific target unbiased mean phases comprises the steps of:
-determining the target unbiased mean phase for a given input signal pair as the unbiased mean phase determined based on said given input signal pair in a situation where only the ear level audio system user is speaking.

7. The method according to claim 1, wherein the step of providing, in response to said identification, information related to the identification that the user of the hearing is speaking to at least one ear level audio system processing stage
comprises the further step of:
modifying a frequency dependent parameter in frequency ranges wherein it has been identified that the user of the ear level audio system is speaking.

8. The method according to claim 7, wherein said frequency dependent parameters are selected from a group of parameters comprising frequency dependent amplification, noise estimation and directional system settings.

9. An ear level audio system comprising a first and a second microphone, a filter bank, a digital signal processor, an own voice detector and an electrical-acoustical output transducer;
wherein the filter bank is adapted to:
transform input signals at least derived from the first and second microphone from a time domain representation and into a time-frequency domain representation;
wherein the digital signal processor is configured to apply a frequency dependent gain that is adapted to at least one of suppressing noise and alleviating a hearing deficit of an individual wearing the ear level audio system;
wherein the own voice detector is adapted to:
estimating an inter-microphone phase difference using the input signals in the time-frequency domain representation;
determining at least one frequency dependent unbiased mean phase from a mean of an estimated inter-microphone phase difference or from a mean of a transformed estimated inter-microphone phase difference;
identifying the situation that a user of the ear level audio system is speaking, in response to a determination that the determined frequency dependent unbiased mean phase is within a predetermined first range; and
providing, in response to said identification, information related to the identification that the user of the hearing is speaking to at least one ear level audio system processing stage.

* * * * *